United States Patent Office 3,169,985
Patented Feb. 16, 1965

3,169,985
1,3-PROPANEDIOL DICARBAMATES
George de Stevens, New Providence, N.J., assignor to Ciba Corporation, New York, N.Y., a corporation of Delaware
No Drawing. Filed Mar. 6, 1962, Ser. No. 177,752
7 Claims. (Cl. 260—482)

This is a continuation-in-part application of my application Serial No. 110,883, filed May 18, 1961, which in turn is a continuation-in-part application of my application Serial No. 55,137, filed September 12, 1960, now abandoned.

The present invention relates to carbamic acid esters, particularly to compounds of the formula

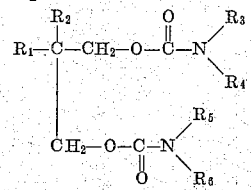

in which $R_1$ stands for a cycloaliphatic or a cycloaliphatic-lower aliphatic radical, $R_2$ represents a lower aliphatic, a cycloaliphatic, a cycloaliphatic-lower aliphatic, a carbocyclic aryl or a carbocyclic aryl-lower aliphatic radical, each of the groups $R_3$ and $R_5$ represents hydrogen, a lower aliphatic, a carbocyclic aryl or a carbocyclic aryl-lower aliphatic radical, and each of the groups $R_4$ and $R_6$ stands for hydrogen or a lower aliphatic radical.

A cycloaliphatic radical $R_1$ and the cycloaliphatic portion of a cycloaliphatic-lower aliphatic radical $R_1$ represents primarily cycloalkyl having from three to eight, especially from five to six, ring carbon atoms and is represented by cyclopentyl or cyclohexyl, as well as cyclopropyl, cyclobutyl, cycloheptyl or cyclo-octyl. A cycloaliphatic radical may also represent a cycloalkenyl radical having from five to eight, preferably from five to six, ring carbon atoms and stands for 1-cyclopentenyl, 2-cyclopentenyl, 3-cyclopentenyl, 1-cyclohexenyl, 2-cyclohexenyl, 3-cyclohexenyl, as well as 1-cycloheptenyl, 2-cycloheptenyl, 3-cycloheptenyl, 2-cyclo-octenyl and the like. The cycloaliphatic radicals may also contain one or more than one substituent, particularly lower alkyl, e.g. methyl, ethyl and the like, which may be attached to any of its ring carbon atoms.

The lower aliphatic portion of a cycloaliphatic-lower aliphatic radical has preferably from one to three carbon atoms and may be represented by lower alkylene, e.g. methylene, 1,1-ethylene, 1,2-ethylene, 1-methyl-1,2-ethylene, 2-methyl-1,2-ethylene, 1,1-propylene, 2,2-propylene or 1,3-propylene. It may also represent lower alkenylene, such as 2-propenylene and the like. A cycloaliphatic-lower aliphatic radical $R_1$ may be represented, above all, by cycloalkyl-lower alkyl, e.g. cyclopropylmethyl, cyclobutylmethyl, cyclopentylmethyl, 1-cyclopentylethyl, 2-cyclopentylethyl, 2-cyclopentyl-2-methylpropyl, 3-cyclopentylpropyl, cyclohexylmethyl, 2-cyclohexylethyl, 3-cyclohexylpropyl, cycloheptylmethyl and the like, as well as cycloalkenyl-lower alkyl, e.g. 1-cyclopentenylmethyl, 2-(2-cyclopentyl)-ethyl, 1-cyclohexenylmethyl, 3-cyclohexenylmethyl, 2-(2-cyclohexenyl)-ethyl, 2-cycloheptenylmethyl and the like, cycloalkyl-lower alkenyl, e.g. 3-cyclopentyl-allyl and the like, or any other suitable cycloaliphatic-lower aliphatic radical.

The radical $R_2$ represents primarily a lower aliphatic radical, especially lower alkyl having from one to seven, particularly from one to four, carbon atoms. A lower alkyl radical may form a straight or a branched carbon chain, and is, for example, represented by methyl, ethyl, n-propyl, isopropyl, n-butyl, isobutyl, secondary butyl, tertiary butyl, as well as n-pentyl, isopentyl, n-hexyl, isohexyl, n-heptyl and the like. A lower aliphatic radical $R_2$ may also represent lower alkenyl, e.g. vinyl, allyl, 2-methylallyl, 2-butenyl, 3-methyl-2-butenyl and the like, or lower alkynyl, e.g. propargyl and the like.

A cycloaliphatic radical $R_2$ or a cycloaliphatic-lower aliphatic radical $R_2$ has the same meaning as the corresponding radicals representing $R_1$; they are represented by cycloalkyl, e.g. cyclopentyl, cyclohexyl and the like, or cycloalkyl-lower alkyl, e.g. cyclopentylmethyl, 1-cyclopentylethyl, 2-cyclopentylethyl, cyclohexylmethyl, 1-cyclohexylethyl, 2-cyclohexylethyl and the like.

The radical $R_2$ may also stand for a carbocyclic aryl, particularly for a monocyclic carbocyclic aryl, as well as a bicyclic carbocyclic aryl, e.g. phenyl, as well as 1-naphthyl or 2-naphthyl, or carbocyclic aryl-lower alkyl, especially monocyclic carbocyclic aryl-lower alkyl, as well as bicyclic carbocyclic aryl-lower alkyl, particularly phenyl-lower alkyl, in which lower alkyl has from one to four carbon atoms, e.g. benzyl, 1-phenylethyl, 2-phenylethyl and the like, as well as diphenylmethyl, 1-naphthylmethyl or any other analogous radical. The carbocyclic portions, particularly phenyl, of the above groups representing $R_2$ may be unsubstituted or may have one or more than one of the same or of different substitutents, which are attached to any of the positions available for substitution. Such substituents are, for example, lower alkyl, e.g. methyl, ethyl and the like, lower alkoxy, e.g. methoxy, ethoxy and the like, halogeno, e.g. fluoro, chloro, bromo and the like, trifluoromethyl and the like, or any other suitable substituents.

The groups $R_3$ and $R_5$, which stand primarily for hydrogen, may also represent lower aliphatic radicals, especially lower alkyl having from one to four carbon atoms, e.g. methyl, ethyl, n-propyl, isopropyl and the like, or any other suitable lower aliphatic radical, such as, for example, lower alkenyl, e.g. allyl, 2-methylallyl and the like, or lower alkynyl, e.g. propargyl and the like, as well as cycloaliphatic radicals, such as cycloalkyl, e.g. cyclopentyl, cyclohexyl and the like, radicals. The groups $R_3$ and $R_5$ may also stand for a carbocyclic aryl or a carbocyclic aryl-lower aliphatic radical; these groups have the same meaning as those mentioned hereinabove and stand primarily for phenyl or phenyl-lower alkyl, e.g. benzyl, 2-phenylethyl and the like.

The groups $R_4$ and $R_6$, which represent primarily hydrogen, may also stand for lower aliphatic radicals, particularly lower alkyl, e.g. methyl, ethyl, n-propyl, isopropyl and the like, or any other lower aliphatic radical, such as those mentioned hereinbefore.

Dicarbamate compounds, particularly the 2,2-di-lower alkly-1,2-propanediol dicarbamates related to 2-isopropyl-2-methyl-1,2-propanediol dicarbamate (meprobamate), are characterized by pronounced muscle relaxant properties which are accompanied by negligible sedative activities and only slight tranquilizing effects, i.e. calming properties, which do not impair physical ability and mental alertness. Contrary to these known compounds, the dicarbamates of this invention, when administered in pharmacologically effective doses, exhibit pronounced tranquilizing, particularly "taming" effects, which are accompanied by negligible sedative and only moderate muscle relaxant properties. The term "taming" is used to define calming effects on naturally vicious or artificially excited animals; under the influence of the compounds of this invention, these animals lose their viciousness and over-excitedness, while retaining their physical ability and mental alertness.

The compounds of this invention can, therefore, be used as calming and tranquilizing agents having only moderate, but beneficial muscle relaxant properties in the treatment of hyperactivity (including neuromuscular hyperactivity, resulting, for example, from psychoneurotic conditions or neurological spasticities), aggressiveness and the like.

Particularly pronounced effects are shown by the compounds of the formula

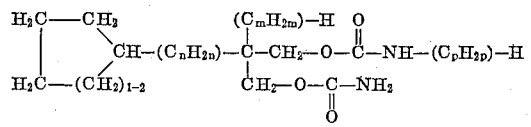

in which the letter *m* stands for an integer from one to four, the letter *n* stands for an integer from zero to two, and the letter *p* stands for an integer from zero to four; the 2-cyclopentyl-2-methyl-1,3-propanediol dicarbamate of the formula

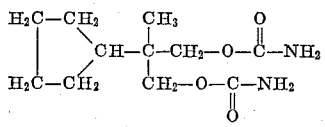

is a compound of this group with outstanding calming and tranquilizing ("taming") effects, accompanied by moderate muscle relaxant and negligible sedative properties.

The compounds of this invention, particularly those of the formula

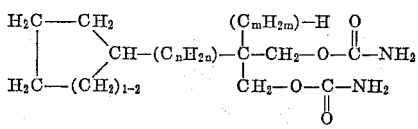

in which the letters *m, n,* and *p* have the previously-given meaning, and especially the 2-cyclopentyl-2-methyl-1,3-propanediol dicarbamate, may be used in the form of pharmaceutical compositions, which contain a pharmacologically effective amount of one of the new carbamate compounds in admixture with pharmaceutical organic or inorganic, solid or liquid carriers suitable for enteral or parenteral administration. For making up the preparations there can be employed substances, which do not react with the new compounds, such as gelatine, lactose, starches, stearic acid, magnesium stearate, colloidal aluminum magnesium silicate, stearyl alcohol, talc, vegetable oils, benzyl alcohols, gums, propylene glycol, polyalkylene glycols or any other known carrier used in medicaments. The pharmaceutical preparation may be primarily in solid form, for example, as capsules, tablets, dragees and the like, as well as in liquid form, for example, as suspensions, emulsions and the like. If desired, they may contain auxiliary substances, such as, for example, preserving, stabilizing, wetting, emulsifying agents and the like, salts for varying the osmotic pressure, buffers, etc. They may also contain, in combination, other pharmacologically useful substances.

The new compounds of the present invention may be prepared, for example, by converting in a diol of the formula

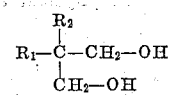

in which $R_1$ and $R_2$ have the previously-given meaning, the hydroxyl groups into carbamyloxy groups.

The above conversion is carried out, for example, by treating the diol starting material with a suitable isocyanate reagent. The latter is, for example, a metal isocyanate reagent, particularly an alkali metal isocyanate, e.g. sodium isocyanate, potassium isocyanate and the like, or an alkaline earth metal isocyanate, e.g. magnesium isocyanate, calcium isocyanate and the like, or any other suitable isocyanate compound. These reagents are employed in the presence of an acid, particularly a mineral acid, e.g. hydrochloric acid (which acid may be employed in its gaseous form), sulfuric acid and the like. The reaction is preferably carried out in the presence of an inert solvent, such as, for example, a halogenated hydrocarbon, e.g. chloroform and the like, an ether, e.g. p-dioxane, diethyleneglycol dimethylether and the like, or any other suitable solvent; cooling, and/or the atmosphere of an inert gas, e.g. nitrogen and the like, may be required. The metal isocyanate reagents yield N-unsubstituted carbamate compounds.

In the presence of the acid, these metal isocyanates yield cyanic acid, which reacts with the diol starting material to form the desired carbamate. Cyanic acid, a stable compound, may, therefore, also be used as a reagent in the above conversion of the diols into their N-unsubstituted carbamates.

The conversion of the hydroxyl into carbamyloxy groups may also be achieved by treating the diol starting material with an organic isocyanate, such as a lower aliphatic isocyanate, for example, lower alkyl isocyanate, e.g. methyl isocyanate, ethyl isocyanate and the like, or any other lower aliphatic isocyanate, as well as a carbocyclic aryl-isocyanate, such as a monocyclic carbocyclic aryl isocyanate, e.g. phenyl isocyanate and the like, or a carbocyclic aryl-lower aliphatic isocyanate, such as a monocyclic carbocyclic aryl-lower alkyl isocyanate, e.g. benzyl isocyanate and the like. These reactants, which are used in the absence or presence of an inert solvent, and may also be formed in the course of the reaction, yield N-substituted carbamate compounds.

Other reagents, which may also be employed in the conversion of the diol starting material into the desired dicarbamate product, are, for example, lower alkyl carbamates, e.g. urethane and the like, which esters are employed together with a suitable reagent, particularly an aluminum lower alkoxide, such as aluminum isopropoxide and the like, in the presence of an inert solvent, such as a hydrocarbon, e.g. toluene and the like.

Furthermore, the carbamates may also be formed by reacting the diol with phosgene and either simultaneously or subsequently with ammonia, a primary amine or a secondary amine, such as, for example, an N-lower alkyl-amine, e.g. N-methylamine, N-ethylamine, N-n-propyl-amine and the like, an N,N-di-lower alkyl-amine, e.g. N,N-dimethylamine and the like, aniline, an N-lower alkyl-aniline, e.g. N-methyl-aniline, N-ethyl-aniline and the like, an N-phenyl-lower alkyl-amine, e.g. N-benzyl-amine, N-(2-phenylethyl)-amine and the like, an N-lower alkyl-N-phenyl-lower alkyl-amine, e.g. N-benzyl-N-methyl-amine and the like; the above reaction is carried out while cooling.

The diols used as the starting material and having the formula

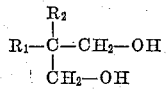

in which $R_1$ and $R_2$ have the previously-given meaning, may be prepared, for example, by converting in a di-lower alkyl $\alpha$-$R_1$-$\alpha$-$R_2$-malonate, in which $R_1$ and $R_2$ have the previously-given meaning, the esterified carboxyl groups into carbinol groups.

This above conversion is carried out according to known methods, for example, by treatment with a suitable reducing reagent, for example, an alkali metal aluminum hydride, e.g. lithium aluminum hydride and the like, in the presence of a suitable diluent, e.g. diethyl ether and the like.

The above starting materials are new and are intended to be included within the scope of this invention; preferred diols are those of the formula

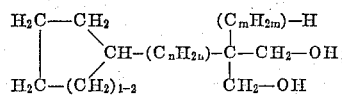

in which the letter m is an integer from one to four, and the letter n is an integer from zero to two, particularly the 2-cyclopentyl-2-methyl-1,3-propanediol of the formula

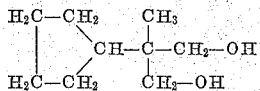

The compounds of this invention may also be prepared by converting in a compound of the formula

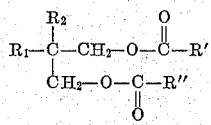

in which $R_1$ and $R_2$ have the previously-given meaning, and each of the groups R' and R'' stands for etherified hydroxyl or halogeno, the groups R' and R'' into amino groups.

The substituents R' and R'' in the above di-carbonate starting materials have preferably the same meaning and represent primarily etherified hydroxyl, such as lower alkoxy, e.g. methoxy, ethoxy and the like, or any other suitably etherified hydroxyl group, such as carbocyclic aryloxy, for example, monocyclic carbocyclic aryloxy, e.g. phenyloxy and the like, as well as tetrahydropyranyloxy and the like; they may also represent halogeno, e.g. chloro and the like. The conversion of the groups R' and R'' into amino groups is carried out according to known methods, for example, by treatment with ammonia, a primary amine or a secondary amine; if necessary, such reaction is carried out in the presence of a suitable inert solvent. Cooling or an elevated temperature may be required, and the reaction may be performed in a closed vessel and/or in the atmosphere of an inert gas, e.g. nitrogen.

The starting materials used in the above reaction may be formed according to known methods. For example, a 2-$R_1$-2-$R_2$-1,3-propanediol may be reacted with a di-lower alkyl carbonate, e.g. diethyl carbonate and the like, to yield a 5-$R_1$-5-$R_2$-1,3-dioxan-2-one; when treated with an alcohol, for example, a lower alkanol, e.g. methanol, ethanol and the like, the latter furnishes a 2-$R_1$-2-$R_2$-1,3-propanediol mono-carbonate (particularly a mono-lower alkyl-carbonate), which is then converted into the desired 2-$R_1$-2-$R_2$-1,3-propanediol di-carbonate (particularly di-lower alkyl-carbonate) starting material by treatment with a lower alkyl halogeno-carbonate, e.g. ethyl chlorocarbonate and the like, or any other analogous reagent, e.g. phenyl chlorocarbonate and the like. The 2-$R_1$-2-$R_2$-1,3-propanediol dihalogeno-carbonates (particularly dichloro-carbonates), which may also be used as the starting materials, may be prepared by reacting the 2-$R_1$-2-$R_2$-1,3-propanediol with one mol of a di-halogeno-carbonate, e.g. phosgene and the like, in the presence of the necessary amount of a tertiary amine, e.g. N,N-dimethylaniline and the like, to yield a 2-$R_1$-2-$R_2$-1,3-propanediol mono-halogeno carbonate (particularly mono-chloro-carbonate), which is then treated with another mol of a dihalogeno-carbonate, e.g. phosgene and the like, in the presence of a suitable tertiary amine, to yield the desired starting material.

The compounds of this invention may also be prepared by converting in a carbamate of the formula

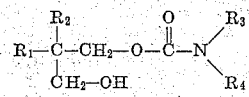

in which $R_1$, $R_2$, $R_3$, and $R_4$ have the previously-given meaning, the hydroxyl group into a carbamyloxy group.

The free hydroxyl group of the mono-carbamate starting material into the carbamyloxy group is carried out as previously shown; treatment with an alkali metal isocyanate in the presence of an acid, e.g. hydrogen chloride and the like (furnishing cyanic acid as the reagent), as well as with an organic isocyanate, with a lower alkyl carbamate, or with phosgene and ammonia, a primary amine or a secondary amine, are the preferred methods.

The starting materials used in the above reaction may be prepared according to known methods; for example, treatment of a previously-described 5-$R_1$-5-$R_2$-1,3-dioxan-2-one with ammonia, a primary amine or a secondary amine, if necessary, while cooling or at an elevated temperature and/or in a closed vessel, yields the desired 2-$R_1$-2-$R_2$-1,3-propanediol monocarbamate. The latter may also be obtained by reacting one of the previously-described 2-$R_1$-2-$R_2$-1,3 - propanediol mono - carbonates (for example, mono-lower alkyl carbonates, mono-phenyl-carbonates or mono-halogeno-carbonates) with ammonia, a primary amine or a secondary amine, if necessary, while cooling or at an elevated temperature and/or in a closed vessel.

The compounds of this invention may also be prepared by converting in a compound of the formula

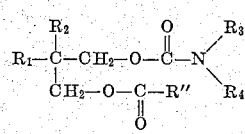

in which $R_1$, $R_2$, $R_3$, $R_4$ and R'' have the previously-given meaning, the group R'' into an amino group.

The above reaction is carried out according to the previously-described procedure; ammonia, a primary amine or a secondary amine is used as the reagent, and cooling or an elevated temperature and/or a closed vessel may be required.

The starting materials used in the above reaction may be prepared according to known methods; for example, the hydroxyl group in a 2-$R_1$-2-$R_2$-1,3-propanediol mono-carbamate may be converted into a carbonate ester group by treatment with a carbonic acid diester (such as a di-lower alkyl carbonate, e.g. diethyl carbonate and the like), or, more especially, with a halogeno-carbonate (such as a lower alkyl chlorocarbonate, e.g. ethyl chlorocarbonate and the like, or any other analogous reagent, e.g. phenyl chlorocarbonate and the like), as well as into a halogeno-carbonate group by reaction with a dihalogeno-carbonate (e.g. phosgene and the like) under the appropriate conditions, if necessary, in the presence of a suitable basic reagent, while cooling or at an elevated temperature and/or in a closed vessel.

The invention also comprises any modification of the process of this invention wherein a compound obtainable as an intermediate at any stage of the process is used as the starting material and the remaining step(s) of the process is (are) carried out, as well as any new intermediates; as has been shown in the conversion of the diol starting material into the dicarbamate compounds, a monocarbamate intermediate may be formed with isolated; such compound may then be subjected to further treatment with one of the above-described reagents.

In the process of this invention such starting materials are preferably used which lead to final products mentioned in the specification as the preferred embodiments of the invention.

The following examples are intended to illustrate the invention and are not to be construed as being limitations thereon. Temperatures are given in degrees centigrade.

*Example 1*

A solution of 2-cyclopentyl-2-methyl-1,3-propanediol in 200 ml. of chloroform is cooled to $-5°$; 11 g. of sodium isocyanate is added, and hydrogen chloride gas is bubbled through the solution during a period of two hours while maintaining a temperature of $0-5°$. A white precipitate is formed; an additional amount of 5 g. of sodium isocyanate is added and gaseous hydrogen chloride is passed through the reaction mixture for two more hours. After standing for one-half hour at 0°, the precipitate is filtered off to yield 24 g. of a dry, solid material, which is stirred with water and refiltered. The pure 2-cyclopentyl-2-methyl-1,3-propanediol dicarbamate of the formula

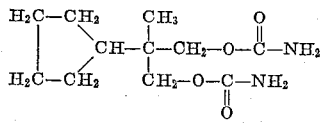

is obtained by recrystallization from a 1:1-mixture of ethanol and water, M.P. 185–187°.

The starting material may be prepared as follows: To a solution of 15.1 g. of sodium in 225 ml. of ethanol is added 113.4 g. of diethyl α-methyl-malonate. The resulting salt is treated with 97.6 g. of cyclopentyl bromide; the reaction mixture is then refluxed for four hours. The solvent is removed by distillation, water is added and the oily layer is extracted with diethyl ether to yield the desired diethyl α-cyclopentyl-α-methyl-malonate, which is purified by distillation, B.P. 132–136°/12–13 mm.; yield: 87 g.

A total of 65 g. of diethyl α-cyclopentyl-α-methyl-malonate is added dropwise to a solution of 13.6 g. of lithium aluminum hydride in 300 ml. of diethyl ether. The reaction mixture is refluxed for one hour, cooled and hydrolyzed with water. After stirring for one hour, the solid material is filtered off, the solvent is removed from the filtrate and hydrochloric acid is added to the residue. The organic material is extracted with diethyl ether, the organic layer is separated and evaporated and the solid material is recrystallized from a mixture of ethanol and water to yield the desired starting material which is used without further purification. The pure 2-cyclopentyl-2-methyl-1,3-propanediol of the formula

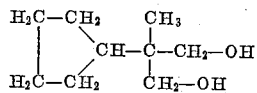

melts at 94–97° after recrystallization from a mixture of ethanol and water.

*Example 2*

A solution of 1.85 g. of 2-cyclohexyl-2-methyl-1,3-propanediol in 100 ml. of chloroform is cooled to −5° and treated with 1.9 g. of sodium isocyanate. Dry hydrogen chloride gas is bubbled through the solution for two hours; an additional amount of 0.9 g. of sodium isocyanate is added and treatment with gaseous hydrogen chloride is resumed for an additional two hours. The reaction mixture is stirred for one-half hour at 0°, the resulting solid material is filtered off and air-dried to yield the 2-cyclohexyl-2-methyl-1,3-propanediol dicarbamate of the formula

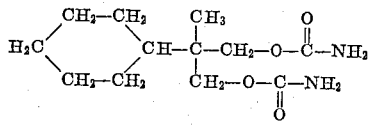

which is purified by recrystallization from a mixture of ethanol and water, M.P. 148–150°.

The starting material may be prepared as follows: A solution of 3.8 g. of diethyl α-cyclohexyl-α-methyl-malonate in 30 ml. of diethyl ether is added dropwise over a period of 1½ hours to a suspension of 1.15 g. of lithium aluminum hydride in 50 ml. of diethyl ether while maintaining refluxing conditions. The reaction mixture is cooled, and 6.6 ml. of water is added while stirring to decompose the complex. After standing overnight, the solid material is filtered off, the filtrate is evaporated, and the residue is taken up in hydrochloric acid. The organic material is extracted with diethyl ether, the organic solution is dried over magnesium sulfate and is evaporated to yield the 2-cyclohexyl-2-methyl-1,3-propanediol of the formula

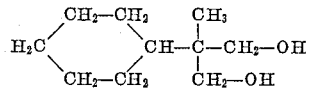

which melts at 70°.

*Example 3*

To a cold solution of 2.5 g. of 2-cycloheptyl-2-methyl-1,3-propanediol in 100 ml. of chloroform is added 2.5 g. of sodium isocyanate; the reaction mixture is treated with dry gaseous hydrogen chloride for two hours and an additional amount of 1.1 g. of sodium isocyanate is added. After treatment with gaseous hydrogen chloride for an additional hour, the desired 2-cycloheptyl-2-methyl-1,3-propanediol dicarbamate of the formula

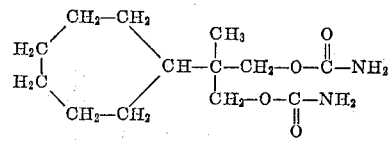

is isolated according to the procedure given in Example 2 and melts at 185–186° after recrystallization from a mixture of ethanol and water.

The starting material may be prepared by adding a solution of 5.4 g. of diethyl α-cycloheptyl-α-methyl-malonate, B.P. 175°/12 mm., in 50 ml. of diethyl ether to a refluxing suspension of 1.6 g. of lithium aluminum hydride in 50 ml. of diethyl ether as described in Example 2; the resulting complex is broken by adding 8.8 ml. of water, and the desired 2-cycloheptyl-2-methyl-1,3-propanediol of the formula

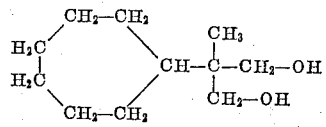

M.P. 60°, is obtained according to the procedure in Example 2.

*Example 4*

A solution of 4.2 g. of 2-cyclopentylmethyl-2-methyl-1,3-propanediol in chloroform is treated with 4.23 g. of sodium isocyanate; hydrogen chloride gas is bubbled through the solution, an additional 2.12 g. of sodium isocyanate is added and treatment with hydrogen chloride gas is continued for an additional two hours. The reaction mixture is worked up as described in Example 2 to the desired 2-cyclopentylmethyl-2-methyl-1,3-propanediol dicarbamate of the formula

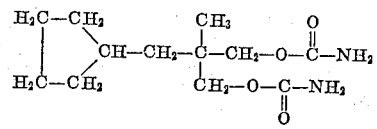

which melts at 119–121° after recrystallization from a mixture of ethanol and water.

The starting material may be prepared by adding a solution of 6.6 g. of diethyl α-cyclopentylmethyl-α-methyl-malonate, B.P. 146–148°/12 mm., in 30 ml. of diethyl ether to a refluxing suspension of 1.95 g. of lithium aluminum hydride in 50 ml. of diethyl ether; the resulting complex is decomposed by adding 11.2 ml. of water, and the desired 2-cyclopentylmethyl-2-methyl-1,3-propanediol of the formula

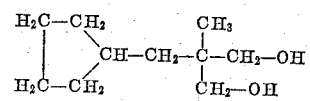

is obtained according to the procedure described in Example 2; the impure material melts at 70–78°.

Example 5

To a solution of 2,2-di-cyclopentyl-1,3-propanediol in 100 ml. of chloroform is added a total of 1.72 g. of sodium isocyanate, and the mixture is treated with hydrogen chloride gas according to the procedure described in Example 2 to yield the 2,2-di-cyclopentyl-1,3-propanediol dicarbamate of the formula

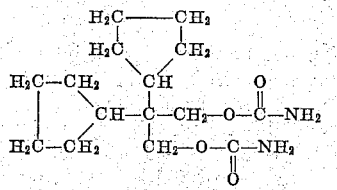

which melts at 127–130°.

The starting material may be prepared as follows: A total of 22.8 g. of diethyl α-cyclopentyl-malonate, B.P. 133–134°/12 mm., is added to a suspension of 4.6 g. of a 52 percent sodium hydride suspension in mineral oil; the reaction takes place after shortly heating the mixture, and is completed after refluxing for 1½ hours. 4.9 g. of cyclopentyl bromide is slowly added, and the reaction mixture is refluxed overnight. The precipitate is added to the residue and treated with a minimum amount of water to dissolve the inorganic material. The organic layer is separated, the aqueous phase is extracted with diethyl ether, and the extract is combined with the separated organic material. The diethyl ether solution is dried over magnesium sulfate, filtered and evaporated, and the diethyl α,α-di-cyclopentyl-malonate is distilled, B.P. 152–168°/12 mm.

A solution of 2.4 g. of the diethyl α,α-di-cyclopentyl-malonate in 20 ml. of diethyl ether is added to a suspension of 0.62 g. of lithium aluminum hydride in diethyl ether; the reaction mixture is refluxed for one hour and allowed to stand overnight. The complex is decomposed by adding 3.6 ml. of water; dilute aqueous hydrochloric acid is added to complete the solution. The organic layer is separated, the aqueous phase is extracted with diethyl ether, and the combined diethyl ether extracts are dried, filtered and evaporated to yield the desired 2,2-di-cyclopentyl-1,3-propanediol of the formula

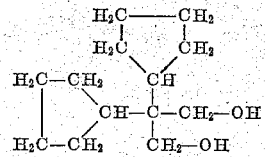

as a thick oil, which is used without further purification.

Example 6

To a solution of 3.0 g. of 3-carbamyloxy-2-cyclopentyl-2-methyl-propanol in 150 ml. of toluene is added 1.32 ml. of pyridine; the mixture is cooled to 5° and treated with 1.66 g. of phosgene in 16 ml. of toluene while maintaining the temperature of below 5°. The reaction mixture is stirred for three hours at room temperature; the pyridine hydrochloride is filtered off, and the filtrate is washed with 5 percent aqueous hydrochloric acid. The organic solution (containing the 1-carbamoyloxy-3-chlorocarbonyloxy-2-cyclopentyl-2-methyl-propane) is dried over magnesium sulfate, filtered and then treated with gaseous N-methylamine. The N-methylamine hydrochloride is filtered off; the filtrate is dried over magnesium sulfate and evaporated to yield the 1-carbamyloxy-2-cyclopentyl-2-methyl-3-(N-methyl-carbamoyloxy)-propane of the formula

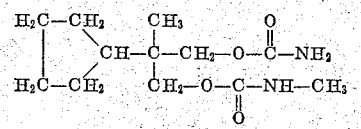

which is purified by distillation, B.P. 120°/0.1 mm.

The starting material is prepared as follows: A solution of 32.0 g. of 2-cyclopentyl-2-methyl-1,3-propanediol in 500 ml. of toluene and 24.2 g. of N,N-dimethylaniline is cooled to 5°, and 20.0 g. of phosgene in 140 ml. of toluene is added slowly. The reaction mixture is stirred at room temperature for three hours, then extracted with 5 percent aqueous hydrochloric acid and dried over magnesium sulfate. After filtration, the organic solution (containing 3-chlorocarbonyloxy-2-cyclopentyl-2-methyl-propanol) concentrated under reduced pressure and the residue is treated with 1000 ml. of concentrated ammonium hydroxide for 24 hours. The organic material is extracted with ethyl acetate, and the organic solution is dried over magnesium sulfate, filtered and evaporated. The residue is extracted with diethyl ether; the first crop of crystalline material represents the 2-cyclopentyl-2-methyl-1,3-propanediol dicarbamate, which is filtered off. The filtrate is allowed to stand for three days and yields the 3-carbamyloxy-2-cyclopentyl-2-methyl-propanol of the formula

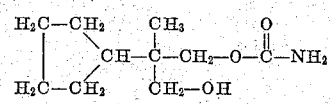

which melts at 95-100° after recrystallization from ethanol.

Other compounds prepared according to one of the previously-described procedures are, for example, 2-cyclopropyl-2-methyl-1,3-propanediol dicarbamate,
2-cyclobutyl-2-methyl-1,3-propanediol dicarbamate,
2-cyclopentyl-2-ethyl-1,3-propanediol dicarbamate,
2-cyclopentyl-2-n-proply-1,3-propanediol dicarbamate,
2-cyclopentyl-2-isopropyl-1,3-propanediol-dicarbamate,
2-cyclopentyl-2-isobutyl-1,3-propanediol dicarbamate,
1-carbamyloxy-2-cyclohexyl-2-methyl-3-(N-methyl-carbamyloxy)-propane,
2-cyclopentyl-2-methyl-1,3-di-(N-methyl-carbamyloxy)-propane,
2-cyclohexyl-2-ethyl-1,3-propanediol dicarbamate,
2-cyclohexyl-2-n-propyl-1,3-propanediol dicarbamate,
2-cyclohexyl-2-isopropyl-1,3-propanediol dicarbamate,
2-n-butyl-2-cyclohexyl-1,3-propanediol dicarbamate,
2-cycloheptyl-2-n-propyl-1,3-propanediol dicarbamate,
2-cyclopentylmethyl-2-ethyl-1,3-propanediol dicarbamate,
2-cyclopentylmethyl-2-n-propyl-1,3-propanediol dicarbamate,
2-(1-cyclopentylethyl)-2-methyl-1,3-propanediol dicarbamate,
2-cyclohexylmethyl-2-methyl-1,3-propanediol dicarbamate,
2-(1-cyclohexylethyl)-2-methyl-1,3-propanediol dicarbamate,
2-(1-cyclohexylethyl)-2-methyl-1,3-propanediol dicarbamate,
2-(2-cyclohexylethyl)-2-n-propyl-1,3-propanediol dicarbamate and the like.

Example 7

The compounds of this invention may be used in the form of pharmaceutically acceptable compositions. Thus, tablets containing 0.5 g. of 2-cyclopentyl-2-methyl-1,3-propanediol dicarbamate as the active ingredient may be prepared as follows (for 120,000 tablets):

Ingredients:

| | G. |
|---|---|
| 2-cyclopentyl-2-methyl-1,3-propanediol dicarbamate | 60,000 |
| Colloidal aluminum magnesium silicate of high viscosity | 1,500 |
| Corn starch | 12,935 |
| Talcum | 1,875 |
| Stearic acid | 375 |
| Purified water, q.s. | |

The 2-cyclopentyl-2-methyl-1,3-propanediol dicarbamate, the aluminum magnesium silicate and 1,750 g. of corn starch are mixed at slow speed for twenty minutes. 5,260 g. of corn starch is suspended in 6,000 ml. of water and stirred until a uniform suspension is obtained. A total of 18,000 ml. of boiling water is added to the suspension and stirring is continued until a smooth paste is formed. The latter is added to the first mix and agitation is continued until granules are formed. The wet mass is passed through a No. 5 stainless steel screen employing a mill operating at low speeds. The screened material is dried at 110° until the moisture content is between 2 and 3 percent; the mass is passed through a No. 10 wire mesh screen again employing a mill, this time at medium speed. The ground granules are placed in a mixer, the talcum, the stearic acid and the remaining corn starch are added; the mixture is mixed well and the granules are compressed into tablets weighing 0.625 g. using a compressing machine equipped with $^{19}/_{32}$ inch standard concave punches (uppers bisected and lowers monogrammed) and $^{19}/_{32}$ inch dies.

What is claimed is:

1. A compound of the formula

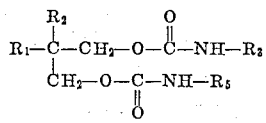

in which $R_1$ is a member selected from the group consisting of cycloalkyl having from three to eight carbon atoms, and cycloalkyl-lower alkyl, in which cycloalkyl has from three to eight carbon atoms, $R_2$ is a member selected from the group consisting of lower alkyl, and cycloalkyl having from three to eight carbon atoms, and each of the groups $R_3$ and $R_5$ is a member selected from the group consisting of hydrogen and lower alkyl.

2. A compound of the formula

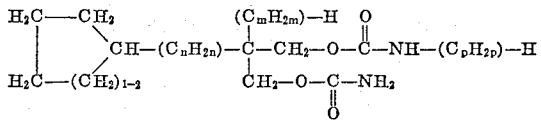

in which the letter $m$ stands for an integer from one to four, the letter $n$ stands for an integer from zero to two, and the letter $p$ stands for an integer from zero to four.

3. 2-cyclopentyl-2-methyl-1,3-propanediol dicarbamate.
4. 2-cyclohexyl-2-methyl-1,3-propanediol dicarbamate.
5. 2-cycloheptyl-2-methyl-1,3-propanediol dicarbamate.
6. 2 - cyclopentylmethyl-2-methyl-1,3-propanediol dicarbamate.
7. 1 - carbamoyloxy - 2 - cyclopentyl - 2 - methyl - 3 - (N-methyl-carbamyloxy)-propane.

References Cited by the Examiner
UNITED STATES PATENTS

| | | | |
|---|---|---|---|
| 2,555,912 | 6/51 | Arnold | 260—617 |
| 2,837,560 | 6/58 | Beinfest. | |
| 2,884,444 | 4/59 | Berger. | |
| 2,917,549 | 12/59 | Hasek et al. | 260—617 |
| 2,921,966 | 1/60 | Carbon et al. | 260—617 |
| 2,934,559 | 4/60 | Beinfest et al. | 260—482 |
| 2,937,119 | 5/60 | Berger. | |
| 2,971,979 | 2/61 | Meiser et al. | 260—482 |

LORRAINE A. WEINBERGER, *Acting Primary Examiner.*

LEON ZITZER, DANIEL D. HORWITZ, *Examiners.*

UNITED STATES PATENT OFFICE
CERTIFICATE OF CORRECTION

Patent No. 3,169,985                                             February 16, 1965

George de Stevens

It is hereby certified that error appears in the above numbered patent requiring correction and that the said Letters Patent should read as corrected below.

Column 3, lines 29 to 34, the formula should appear as shown below instead of as in the patent:

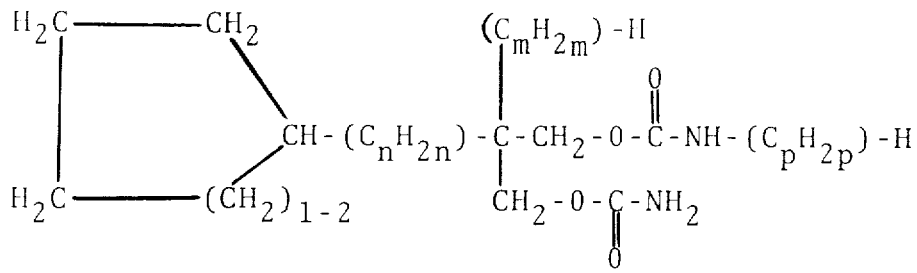

column 6, line 57, for "with" read -- and --.

Signed and sealed this 14th day of September 1965.

(SEAL)
Attest:

ERNEST W. SWIDER                                    EDWARD J. BRENNER
Attesting Officer                                    Commissioner of Patent